(12) United States Patent
Milburn

(10) Patent No.: US 6,594,957 B1
(45) Date of Patent: Jul. 22, 2003

(54) INSULATED GREENHOUSE

(75) Inventor: Douglas I. Milburn, North Sydney (CA)

(73) Assignee: Advanced Glazings Ltd., Sydney (CA)

( * ) Notice: Subject to any disclaimer, the term of this patent is extended or adjusted under 35 U.S.C. 154(b) by 0 days.

(21) Appl. No.: 09/856,663

(22) PCT Filed: Nov. 23, 1999

(86) PCT No.: PCT/CA99/01121
§ 371 (c)(1),
(2), (4) Date: Jul. 24, 2001

(87) PCT Pub. No.: WO00/30431
PCT Pub. Date: Jun. 2, 2000

(30) Foreign Application Priority Data

Nov. 24, 1998 (CA) ............................................. 2254457

(51) Int. Cl.[7] ................................................. E04B 7/00
(52) U.S. Cl. .................. 52/22; 52/407.2; 52/407.3; 52/407.5; 52/86; 47/17; 47/19.1
(58) Field of Search .................. 52/786.1, 786.11, 52/86, 63, 22, 407.2, 407.3, 407.5; 47/17, 19.1

(56) References Cited

U.S. PATENT DOCUMENTS

| | | | | |
|---|---|---|---|---|
| 3,389,510 A | * | 6/1968 | Stock | 47/17 |
| 4,531,511 A | * | 7/1985 | Hochberg | 126/617 |
| 4,744,403 A | * | 5/1988 | Hausmann et al. | 160/272 |
| 4,878,322 A | * | 11/1989 | Ikeda et al. | 52/2.18 |
| 5,514,428 A | * | 5/1996 | Kunert | 156/109 |
| 5,524,381 A | * | 6/1996 | Chahroudi | 126/572 |
| 5,784,853 A | * | 7/1998 | Hood et al. | 52/786.11 |
| 6,131,363 A | * | 10/2000 | Phillips | 359/595 |
| 6,282,834 B1 | * | 9/2001 | Mossey | 47/17 |

FOREIGN PATENT DOCUMENTS

| | | |
|---|---|---|
| DE | 19 57 208 A | 5/1971 |
| DE | 37 08 847 A1 | 11/1987 |
| DE | 198 06 424 A | 8/1999 |
| EP | 0 306 717 A | 3/1989 |
| FR | 2 381 875 A | 9/1978 |
| FR | 2 598 881 A | 11/1987 |
| FR | 2 600 230 A | 12/1987 |

* cited by examiner

*Primary Examiner*—Kimberly Wood
(74) *Attorney, Agent, or Firm*—Marks & Clerk

(57) ABSTRACT

A greenhouse includes a frame structure (1), an outer transparent covering layer (2), and a transparent inner layer (7). A transparent insulating sheet-like material is located between the inner and outer layers in close proximity to the inner layer (8). The insulating sheet-like material has a cellular structure (4, 5) with the axis of its cells generally oriented normal to the plane thereof material so as to transmit incident light therethrough. The insulation material helps to retain heat within the structure while avoiding detrimental effects, such as loss of light transmissivity. The creation of an air gap on one side between the transparent insulation and one of the glazings allows for control of moisture and snow buildup.

20 Claims, 6 Drawing Sheets

INSULATED GREENHOUSE

This invention relates to generally to the field of greenhouse construction, and more particularly to an insulated greenhouse.

Greenhouses (also known as glasshouses, hothouses, coldframes, and the like) are frame structures (made of wood, metal or other materials) that are covered with a transparent layer or layers (generally plastic film, rigid plastic, or glass), which permit natural light to enter, while at the same time maintaining a barrier from the elements. Greenhouses work on the principle that shorter wavelength light passes through the transparent layers to be absorbed within the structure, driving photosynthesis and providing heat. The envelope of the greenhouse provides some resistance against loss of heat, and the interior is kept warm partly through absorbed solar energy, and partly by the addition of auxiliary heat.

Presently, greenhouses are generally built without insulation, and this creates a number of problems, including high heating costs, condensation problems, temperature variation throughout the greenhouse, and limited ability to store daytime heat. It would be desirable to add insulation, but conventional insulation has not proved applicable to greenhouses because it blocks light transmittance.

An object of the invention is to alleviate this problem.

SUMMARY OF THE INVENTION

According to the present invention there is provided a greenhouse comprising a frame structure, an outer transparent covering layer on said frame structure, a transparent inner layer, and a transparent insulating sheet-like material between said inner and outer layers in close proximity to one of said layers and spaced from the other of said layers, said insulating sheet-like material having a cellular structure with the axis of its cells generally oriented normal to the plane thereof so as to transmit incident light therethrough.

This insulating material provides good heat insulation without significantly affecting light transmission. It insulates by suppressing convection through its small cell size to create a significant thickness of 'dead air', and also provides infrared blocking properties to the extent that the cell walls absorb infrared radiation.

The transparent insulation should be normally spaced from the outer transparent covering so as to define a gap, typically an air gap, and be in intimate contact with the transparent inner layer, which then closes the cells to prevent air circulation and also act as a warm vapor barrier. The inner transparent layer preferably also serves as a support for the transparent insulation.

This support can be an underlying glazing layer. The inner glazing, however, is not required to bear a significant load, such as wind, snow and ice. This can be used to gain two important advantages, namely:

i) maximization of light transmittance The addition of a second glazing leads to some loss of light transmittance because of the less-than-unity transmittance of the glazing itself, as well as the loss-of-aperture caused by introduction of opaque framing elements. However, because this glazing is not required to bear any major loads (e.g. wind & snow), the supporting frame can small and widely spaced to minimize aperture loss; there is much more freedom to choose the inner glazing material on the basis of its light transmittance (for example, a thin layer of very-high transmittance PTFE film can be used, even though a film thick enough to be used in load-bearing situations would be prohibitively expensive); and the inner glazing layer and the transparent insulation which is in contact with the inner glazing layer can be oriented so that the sun is incident at an optimal angle for minimum loss by reflection or scattering.

ii) the inner glazing can be optimized to minimize cost, compatible with standard greenhouse systems for natural ventilation, and/or adapted to optimize condensation runoff.

This invention makes use of the fact that honeycomb transparent insulations need only be in close contact with one glazing to be effective, and that gravity, along with tension and curvature, can be used to keep transparent insulation in close contact with an underlying glazing. Thus an inner glazing can be installed in a greenhouse, and the transparent insulation simply laid on top of it. In particular, the transparent insulation should be mounted in a manner that leaves a significant air gap between the transparent insulation and the outer glazing. This air gap can be used for a number of purposes, including i) prevention of crushing of transparent insulation by external loads, ii) inflation of outer glazing, iii) removal of moisture by ventilation or dehumidification, iv) controlled heating to defrost, de-ice or remove snow from, the outer glazing. In the absence such an air gap, moisture build would destroy the optical properties, lead to the growth of mildew and algae, and destroy the insulation.

In particular, this invention also teaches how to attach the transparent insulation to greenhouses in such a way that it stays in intimate contact with at least one glazing, as well as how to solve problems of crushing, control and removal of moisture from the insulation cavity, inflation to remove slack from outer film glazings, and removal of snow, ice, and frost from the exterior of the greenhouse.

Honeycomb transparent insulation material refers to a class of materials that are designed to transmit a maximum amount of light incident upon them, while providing a significant amount of insulation value. They have a cellular structure, with the axis of the cells being oriented through the structure, in such a way that i) dead air spaces are created; ii) thermal infrared radiation is interfered with to some degree; and iii) incident light is either transmitted or forward reflected by the cell walls. The concept of honeycomb transparent insulation was first suggested by Dr. K. G. T. Hollands while a graduate student at McGill University, Montreal, Canada, and has been extensively researched and a number of publications exist on the subject. Several commercially-available transparent insulations are available. These include rigid materials made by extrusion, or bundling of capillaries, and also a new generation of film-based materials that are semi-rigid. Examples are Okalux Kappilarglas Gmbh. of Marktheidenfeld-Atfeld Germany, which makes kappilux® capillary-bundled transparent insulation, Arel Energy Ltd. of Yavne, Israel, which makes Arel® extruded transparent insulation, and of course Advanced Glazings Ltd., North Sydney, NS Canada which makes InsolCore® film-based transparent insulation.

By using this invention, a greenhouse structure can be built or retrofitted in a way that the benefits of an insulated building envelope are obtained, while retaining high transparency and the benefits of natural light (i.e. a structure can be built that has lower heating costs, less condensation, and less variation of temperature throughout the internal volume, than normal uninsulated greenhouse construction, yet retains the ability to admit natural light to provide for plant growth).

The invention also solves a number of practical problems that occur when applying transparent insulation to greenhouses:

1) this invention provides a practical and economical technique for applying the material. To date, lack of a practical attachment method has blocked the use of transparent insulation in greenhouses.
2) this invention keeps the honeycomb transparent insulation in close proximity to at least one glazing, by using gravity, and possibly tension with curvature. This is a necessary condition that must be met in order for the honeycomb transparent insulation to block convection and provide insulation value.
3) The invention may provide an air gap between the transparent insulation and the outer glazing. This solves the following problems:
   i) without the air gap, the transparent insulation could be crushed and damaged if the outer glazing deflected downwards, as it is likely to do under snow and wind load. This is important with rigid outer glazings, and critical with semi-rigid or film-type outer glazings.
   ii) buildup of water and condensation in the transparent insulation can be prevented, by any combination of dehumidification, circulation, and external venting of this air gap.
   iii) snow, frost, and ice build-up on the outer surface of a greenhouse can cause loss of light transmittance, and excessive physical loading of the glazing and structure. With traditional poorly-insulating glazings, snow, frost, and ice buildup can be controlled by simply turning up the heat in the structure. In greenhouses covered with an inflated double polyethylene film, the source of inflation pressure is turned off, which lets the outer layer collapse onto the inner layer, thus negating the insulation value of the air gap between the films and allowing internal greenhouse heat to melt snow on the external surface of the greenhouse. On the other hand, the use of honeycomb transparent insulation could potentially increase problems of snow buildup, because it slows the transfer of internal heat from the inside of the greenhouse to the external surface, and thus slows the rate of melting. But the use of this invention to attach the transparent insulation allows the problem of snow buildup to be addressed by mounting a heat source in the air gap above the transparent insulation and below the outer glazing. In this way, heat can be applied to defrost or melt snow on the outer glazing, thus solving the snow/ice/frost problem.
   iv) if a plastic film is used as an outer glazing, it is sometimes desirable to use air pressure to inflate the outer glazing so that the film is under constant tension. This prevents violent flapping or oscillatory movement of the plastic due to wind action, which can rapidly destroy the film. In standard uninsulated film greenhouse construction, this is done by introducing pressurized air into the gap between two poly films which are both mounted on the outside of the greenhouse framework. But such conventional construction is not suitable for mounting transparent insulation because the transparent insulation would get crushed between the layers. However, this invention allows the use of a film as an outer glazing mounted on the outside of the greenhouse frame, in addition to the lower glazing (which may be film or rigid) which supports the transparent insulation, and one which is mounted in on the outside of the main roof frame. And if care is taken to ensure that the air gap between the inner and outer glazings is sealed, pressurized air may be introduced into this air gap, thus inflating the outer glazing and preventing slack-tension related wind damage to this outer glazing.

The invention also provides a method of insulating a greenhouse comprising the steps of placing transparent insulating sheet-like material between an outer transparent covering layer and a transparent inner layer, said insulating sheet-like material having a cellular structure with the axis of its cells generally oriented normal to the plane thereof so as to transmit incident light therethrough and being in close proximity to one of said layers.

This invention describes a practical system for mounting transparent insulation in the roof of sidewall greenhouses, or in tunnel-type greenhouses.

BRIEF DESCRIPTION OF THE DRAWINGS

The invention will now be described in more detail, by way of example, only with reference to the accompanying drawings, in which.

DESCRIPTION OF THE PREFERRED EMBODIMENTS

Figure 1A:
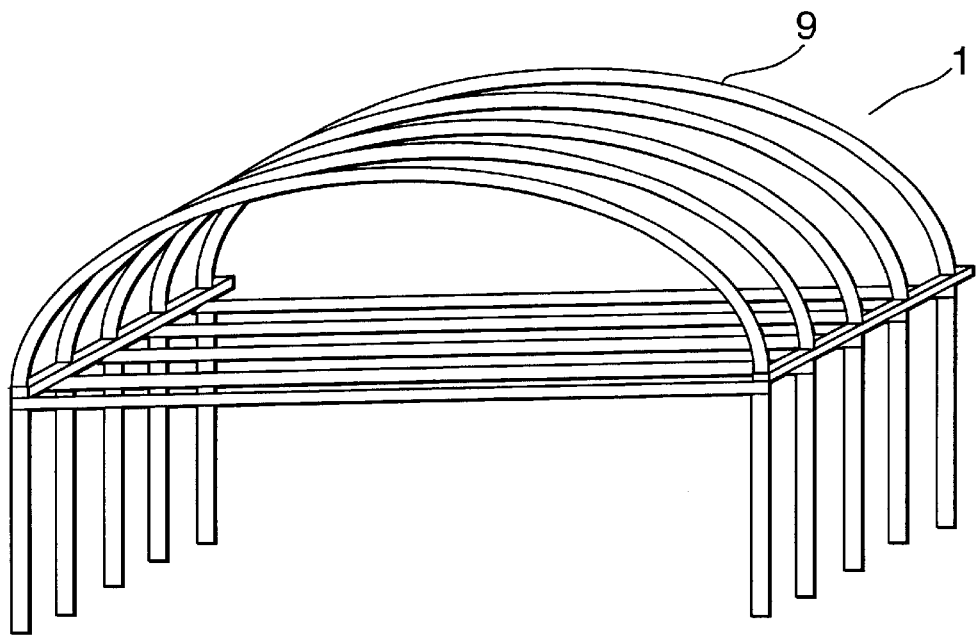
FIGS. 1a to 1d are sketches of various conventional greenhouse frame structures.
Figure 1B:
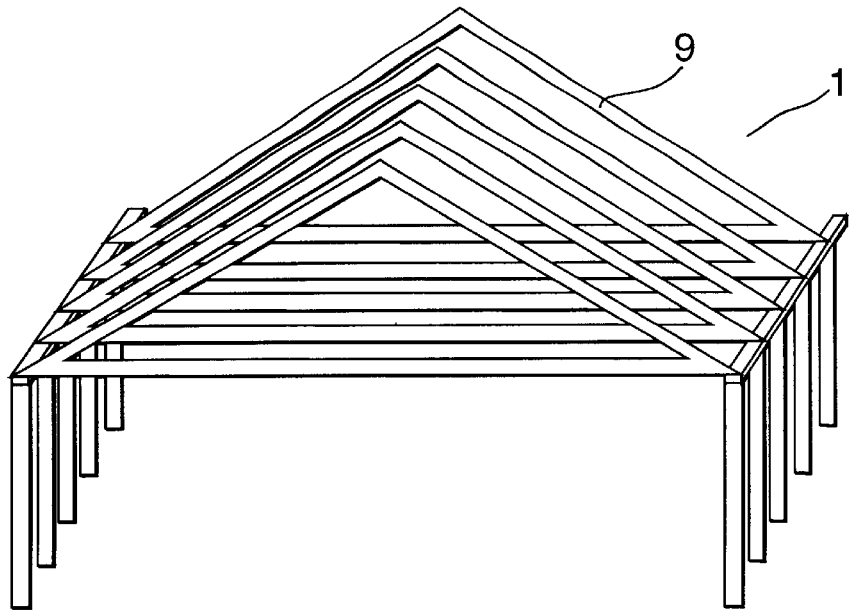
Figure 1C:
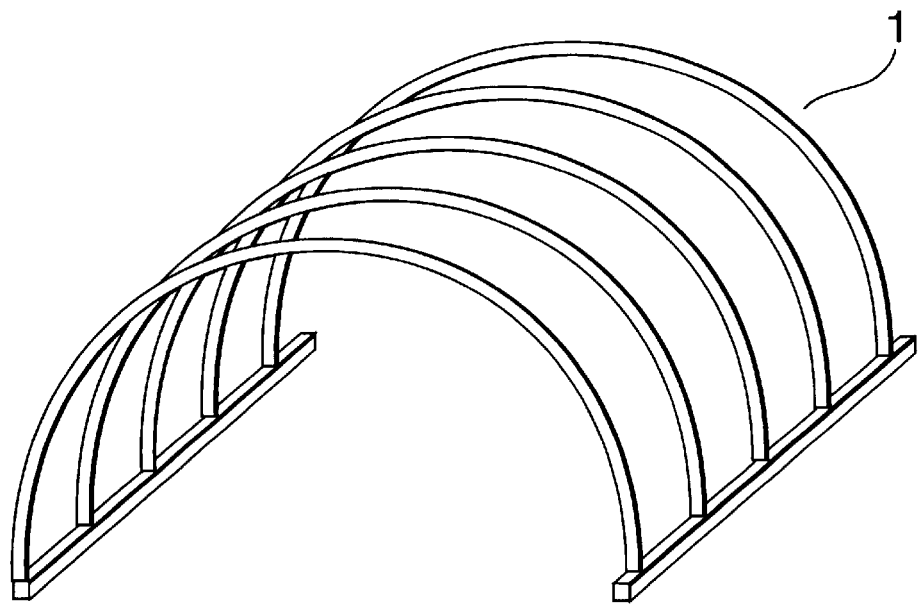
Figure 1D:
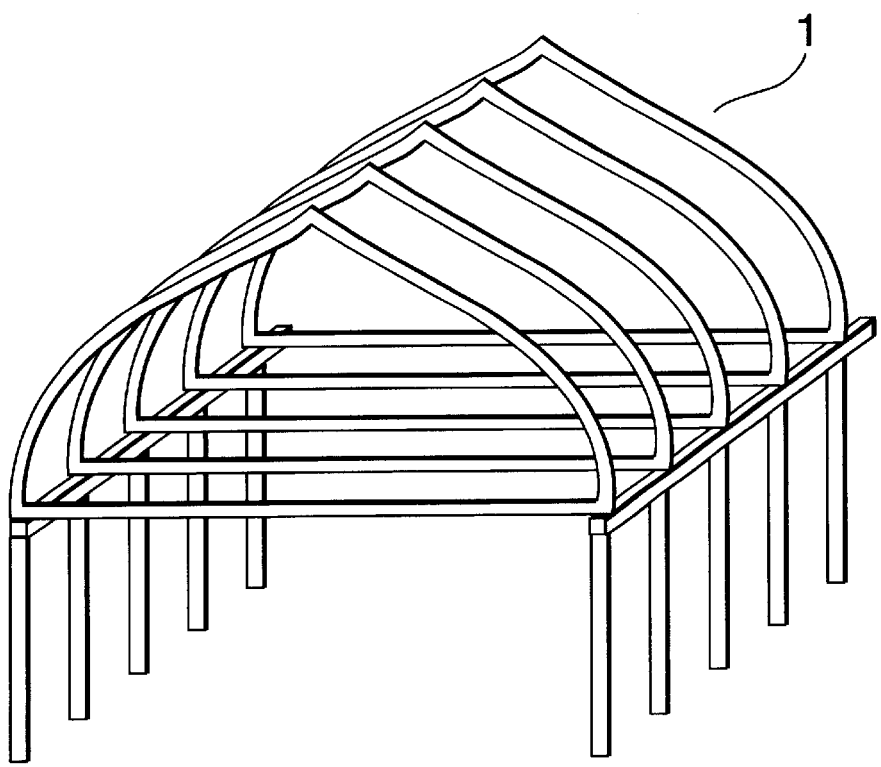

Referring to FIGS. 1a to 1d, conventional greenhouse structures 1 consist of frames of various configurations made of wood, metal, or other materials, which are covered with a single or double layer of transparent material such as glass, rigid plastic sheets, or plastic films. They are generally constructed in sidewall/roof form (FIGS. 1a, 1b, 1d) or tunnel form (FIG. 1a). Roof sections are generally arched (FIGS. 1a, 1c, 1d) or flat (FIG. 1b), and arches are typically gothic (FIG. 1d) or round (FIG. 1a). The roof sections are made of roof supports 9 forming part of the frame structure 1.

Figure 2A:
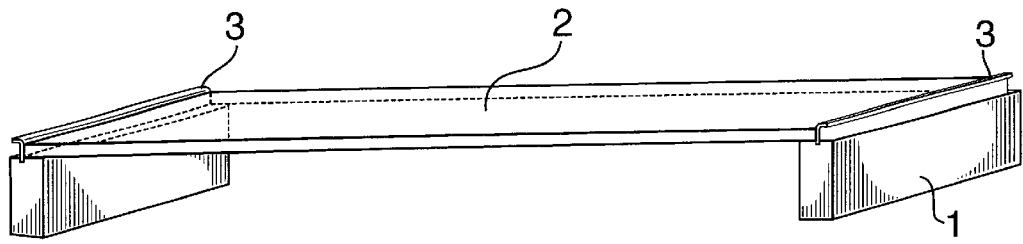
FIGS. 2a to 2c show the conventional manner of attachment of glazing to the frame structure.
Figure 2B:
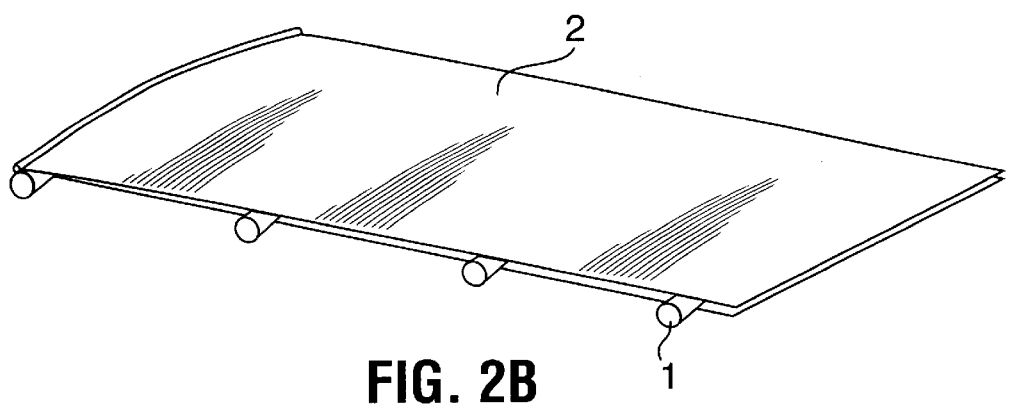
Figure 2C:
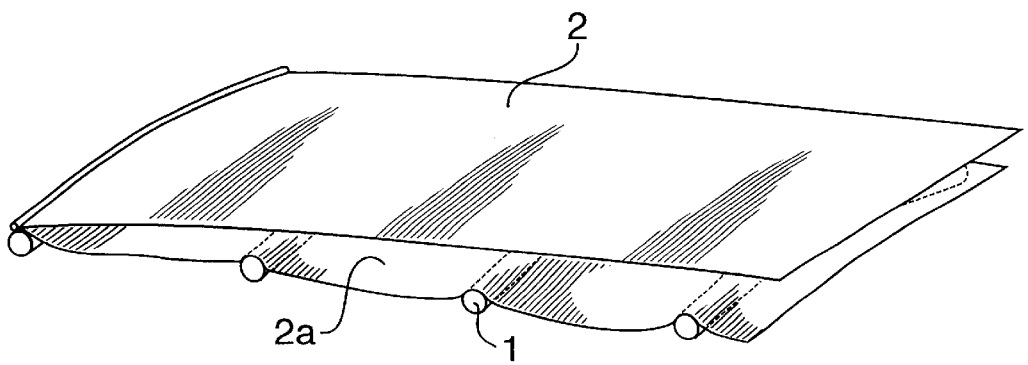

As shown in FIGS. 2a to 2c, glazing 2 is generally attached to the outside of the greenhouse structure. Glazing bars 3 and seals are used to fasten rigid glazings to the frame structure 1. Film glazings are typically stretched over the outside surface of an arched roof, and clipped to the structure around the perimeter of the film. Film is typically used in double-layer and pressure is introduced in the inter-film gap 2a to inflate the double layer as shown in FIG. 2c.

A class of light-transmitting insulation materials have been developed, which are known as honeycomb transparent insulation, convection-suppression insulation, forward-reflecting transparent insulation. They are best identified by the fact that the constituent material is transparent and arranged in a manner such that the majority of the internal surface area is arranged perpendicular so that its normal vector is parallel with the plane of the macroscopic surface. In this way, light that strikes the cell walls is reflected forward through the structure, giving a high light transmittance. Transparent insulation takes the form of rigid tiles, or film-based transparent insulation which is flexible and can be made in continuous lengths, so that a single length could span across a greenhouse roof. Such insulation has been employed in discrete sealed glazing units over atriums and the like, but such units would be unsatisfactory for greenhouses because of cost considerations, and also because the seals would break over time allowing the ingress of moisture.

Figure 3A:
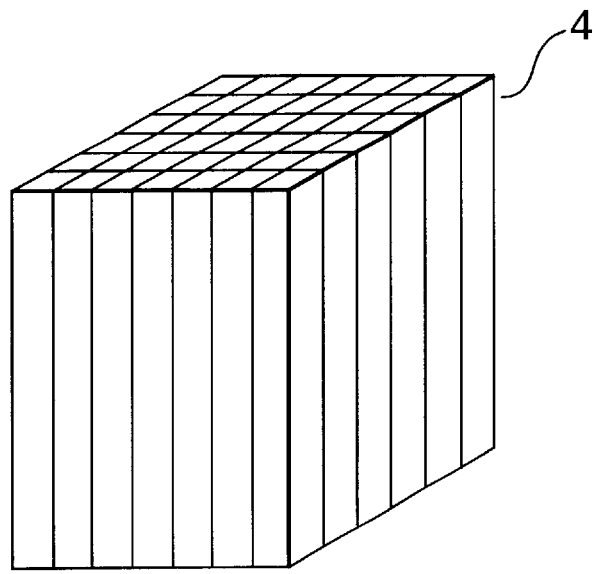
FIGS. 3a and 3b show two types of transparent insulation.
Figure 3B:
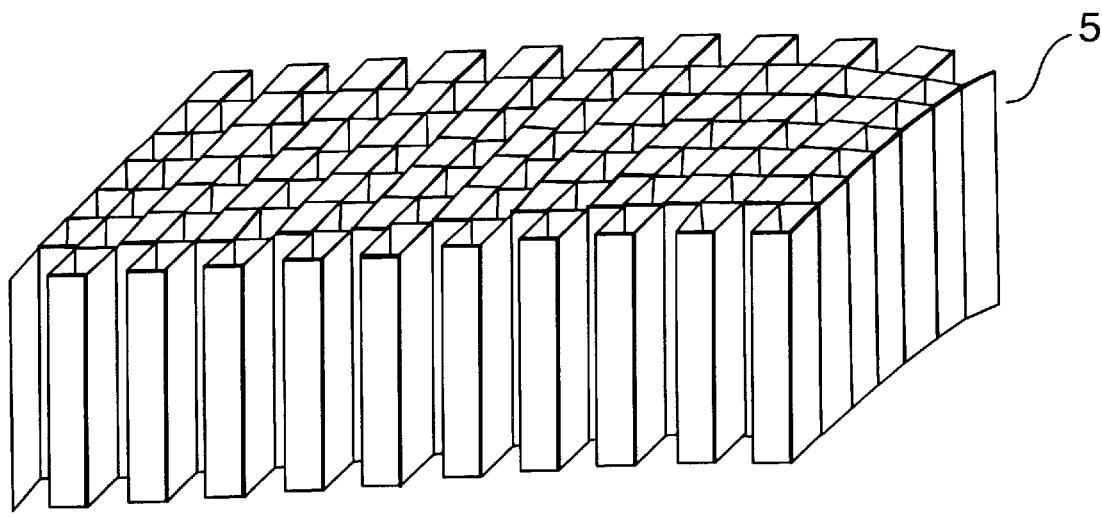

As shown in FIGS. 3a and 3b, such materials can come in the form of rigid tiles 4 (FIG. 3a) and continuous flexible lengths 5 (FIG. 3b). In either case, light transmissive cells extend perpendicular to the plane of the material and transmit light through the material by transmission through the cells and reflectance of the cell walls.

Figure 4A:
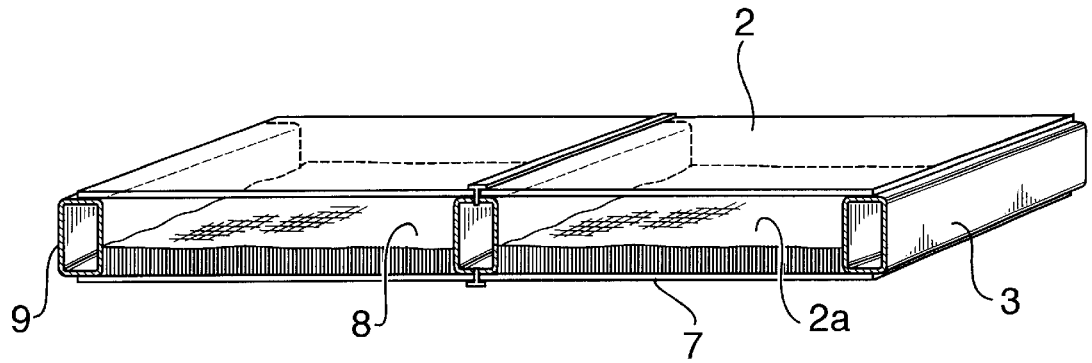
FIGS. 4a and 4b show support structures for the insulation in accordance with the principles of the invention.
Figure 4B:
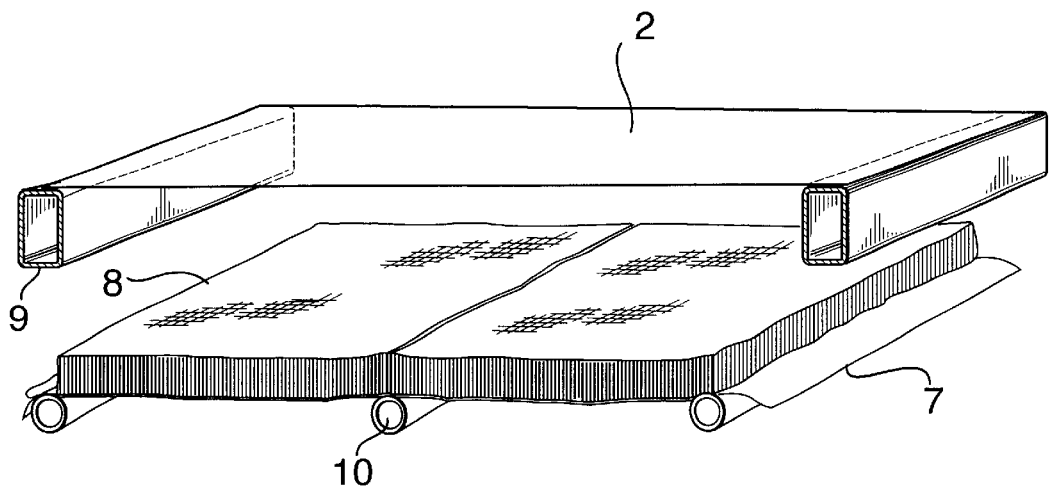

In accordance with the principles of the invention, the transparent insulation can be applied to a greenhouse roof in any manner that results, for example, in the configurations shown in FIGS. 4a and 4b. An inner glazing 7 is typically applied to the greenhouse for the purpose of supporting the transparent insulation 8 and works in conjunction with the transparent insulation 8 in forming an effective insulation and moisture barrier. A suitable insulation is Insolcore™ by Advanced Glazings Ltd, of North Sydney, Nova Scotia.

Figure 5A:
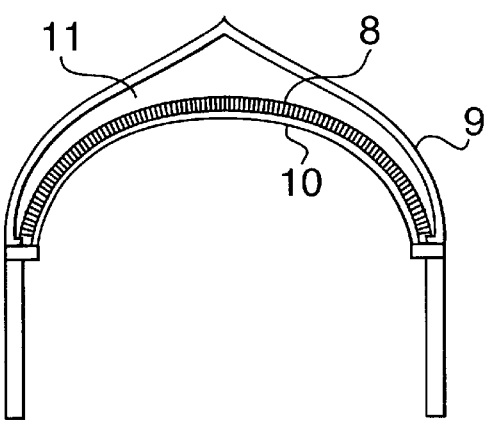
FIGS. 5a to 5c show various alternative supporting configurations.
Figure 5B:
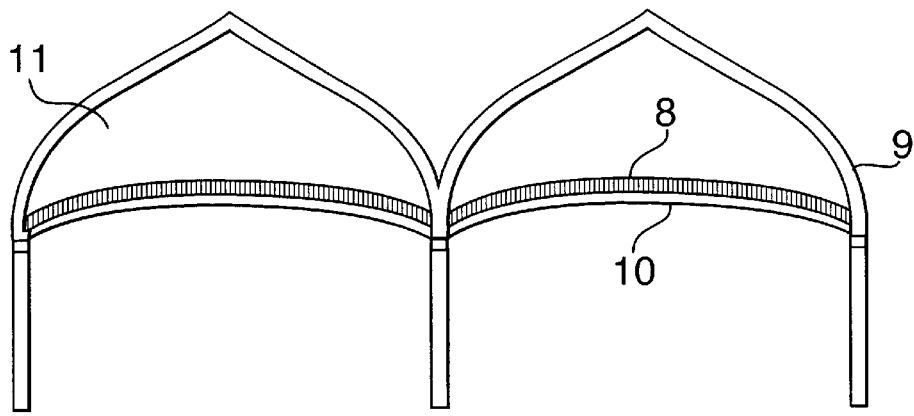
Figure 5C:
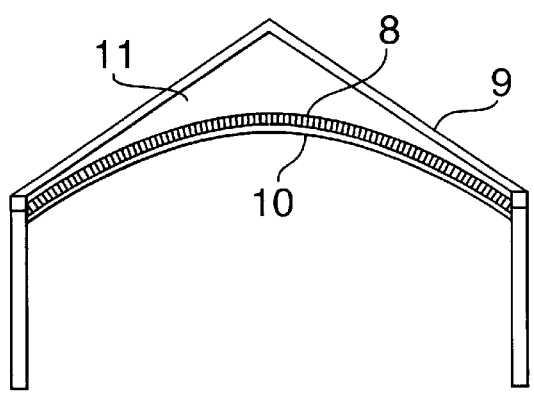

The inner glazing 7 is mounted either on the inside of the conventional main roof supports 9 (by a clip system or other means) or on top of an underlying frame system 10 that is installed specifically to support the inner glazing or other purposes. The distance between the outer and inner glazing support points should be greater than the thickness of the transparent insulation 8 to prevent crushing and to allow for the creation of an air gap. (see FIGS. 5a and 5b)

The transparent insulation 8 is kept in intimate contact with the inner glazing by gravity, as required to effectively suppress convection and provide insulation.

In the case of a long piece of semi-rigid or expandable insulation draped across an arch-shaped inner glazing, the forces of tension interact with the curvature of the arch to pull the insulation into close contact with the underlying glazing, thus assisting gravity. (see FIG. 5a)

The insulation can be kept from shifting out of place and creating un-insulated gaps, by using clips or adhesives to attach it to the greenhouse frame, adjacent insulation, or underlying glazing.

The system can be constructed in a manner so that the air gap 2a between the inner glazing 7 and outer glazing 2 is sealed. This allows pressure to be maintained with the aid of a pump (not shown) so that outer glazing can be inflated, and also allows control of the temperature and humidity of the air gap for by various means and various purposes. Heat pipes may be mounted in the air gap, or hot air blown in from a furnace or beat exchanger, as required to melt snow, ice, or frost. Also, the air gap may be vented to the outdoors or dehumidified to prevent the build of condensation due to moisture that diffuses or leaks from the warm humid greenhouse interior.

The invention provides a novel form of greenhouse with improved insulation properties.

What is claimed is:

1. A greenhouse comprising a frame structure, an outer transparent covering layer on said frame structure, a transparent inner layer, and a transparent insulating sheet material between said inner and outer layers, said transparent insulating sheet material having a cellular structure defining cells having axes generally oriented normal to the plane of said sheet material so as to transmit incident light therethrough, and said inner transparent layer being in close proximity to said transparent insulating sheet material and said outer transparent covering layer and being spaced from said transparent insulating sheet material to define a gap between said transparent insulating sheet material and said outer transparent covering layer.

2. A greenhouse as claimed in claim 1, wherein said transparent inner layer provides a support for said transparent insulating sheet material.

3. A greenhouse as claimed in claim 1, wherein said transparent insulating sheet material is in intimate contact with said inner layer.

4. A greenhouse as claimed in claim 1, wherein said transparent inner layer provides an underlying rigid support for said transparent insulating sheet material.

5. A greenhouse as claimed in claim 4, wherein said underlying rigid support is a rigid inner glazing.

6. A greenhouse as claimed in claim 5, wherein said transparent insulating sheet-material rests on said underlying rigid support under the action of gravity.

7. A greenhouse as claimed in claim 5, wherein said inner glazing is in the form of an arch.

8. A greenhouse as claimed in claim 5, wherein said transparent insulating sheet material is semi-rigid transparent insulation and is mounted so tension/curvature effects maintain said the transparent insulating sheet material in close proximity with the inner glazing.

9. A greenhouse as claimed in claim 1, further comprising means to maintain inflation pressure in said gap.

10. A greenhouse as claimed in claim 1, further comprising a vent for venting or controlling humidity in said gap to prevent buildup of condensation.

11. A greenhouse as claimed in claim 1, further comprising a heater for adding heat to said air gap to heat said transparent outer covering.

12. A method of insulating a greenhouse comprising the steps of:
    placing a transparent inner layer on a frame structure;
    laying a transparent insulating sheet material on said transparent inner layer so as to be in close proximity thereto, said transparent insulating sheet material having a cellular structure with the axis of its cells generally oriented normal to the plane thereof so as to transmit incident light therethrough; and
    providing an outer transparent covering layer over said transparent insulating sheet material such that said outer transparent covering layer is spaced from said transparent insulating sheet material to define a gap therewith.

13. A method as claimed in claim 12, wherein said inner layer provides an underlying rigid support, and said transparent insulating sheet material rests on said underlying rigid support under the action of gravity.

14. A method as claimed in claim 12, wherein said transparent insulating sheet material is semi-rigid, said inner layer is an inner glazing, and said transparent insulating sheet-material is mounted so that tension/curvature effects maintain the transparent insulating sheet material in close proximity with the inner glazing.

15. A greenhouse as claimed in claim 1, wherein said transparent insulating sheet material is flexible.

16. A greenhouse as claimed in claim 15, wherein said transparent insulating sheet material is in the form of a continuous length spanning the frame structure.

17. A greenhouse as claimed in claim 1, wherein said transparent insulating sheet material is in the form of rigid tiles.

18. A method as claimed in claim 12, wherein said transparent insulating sheet material is flexible.

19. A greenhouse as claimed in claim 18, wherein said transparent insulating sheet material is in the form of a continuous length spanning the frame structure.

20. A greenhouse as claimed in claim 14, wherein said transparent insulating sheet material is in the form of rigid tiles.

* * * * *